United States Patent
Elias et al.

(10) Patent No.: US 9,912,738 B2
(45) Date of Patent: Mar. 6, 2018

(54) PREVENTING OVERLOAD IN ENTERPRISE APPLICATION INTEGRATION SERVICES

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 658 days.

(21) Appl. No.: 13/688,348

(22) Filed: Nov. 29, 2012

(65) Prior Publication Data

US 2014/0149564 A1   May 29, 2014

(51) Int. Cl.
*G06F 15/173*  (2006.01)
*H04L 29/08*  (2006.01)

(52) U.S. Cl.
CPC ................ *H04L 67/1002* (2013.01)

(58) Field of Classification Search
CPC ... H04L 47/10; H04L 2012/445; G06Q 10/10; H03L 12/1859; H03L 12/5855
See application file for complete search history.

(56) References Cited

U.S. PATENT DOCUMENTS

2002/0173997 A1* 11/2002 Menard ............... G06Q 30/06
709/223
2010/0121972 A1* 5/2010 Samuels et al. ............. 709/231

OTHER PUBLICATIONS

IBM, International Technical Support Organization, Patterns: SOA Design Using WebSphere Message Broker and WebSphere ESB, Jul. 2007, http://www.redbooks.ibm.com/ redbooks/pdfs/sg247369.pdf.*

(Continued)

*Primary Examiner* — Brian Whipple
*Assistant Examiner* — Gregory P Tolchinsky
(74) *Attorney, Agent, or Firm* — Lowenstein Sandler LLP

(57) ABSTRACT

A mechanism for preventing overload in enterprise application integration (EAI) services. A method includes determining, by a processing device executing enterprise application integration (EAI) system, a first location in a chain of services in the EAI. The method also includes providing, by the processing device, access for insertion of an overload prevention service beginning (OPSB) at the first location in the chain of services in the EAI. The OPSB includes a service in the chain of services and counts number of messages processed in the EAI service. The method also includes determining, by the processing device, a second location in the chain of services in the EAI. The second location occurs after the first location in the chain of services in the EAI. The method further providing, by the processing device, access for the insertion of an overload prevention service end (OPSE) at the second location in the chain of services in the EAI. The OPSB is in communication with the OPSE and the OPSE comprises a service in the chain of services and is in communication with the OPSB.

14 Claims, 7 Drawing Sheets

(56) References Cited

OTHER PUBLICATIONS

IBM, International Technical Support Organization, Migrating to WebSphere Message Broker Version 6.0, Mar. 2006, p. 44, http://www.redbooks.ibm.com/redbooks/pdfs/sg247198.pdf.*

"Sun GlassFish Enterprise Server v2.1.1 Administration Reference"; Chapter 1 The Domain.ml File > O > overload-protection-servie; http://docs.oracle.com/cd/E19575-01/821-0183/gjdmk/index.html; 2 pages.

"Enterprise Service Bus"; Mar. 8, 2013; http://www.cordys.com/enterprise-service-bus; 2 pages.

Boyes, Ryan; "SOA Federation"—Middleware Conversations, https://www-304.ibm.com/connections/blogs/aim/entry/soa_federation3?lang=cs_cz; 2 pages, Nov. 28, 2011.

* cited by examiner

| Time | Input messages | OPSB limit | Output messages | $K_x$ |
|---|---|---|---|---|
| 8:00 | 400 | x | 400 | 1 |
| 8:10 | 600 | x | 600 | 1 |
| 8:20 | 1000 | x | 1000 | 1 |
| 8:30 | 1050 | x | 1000 | 0,95 |
| 8:40 | 1100 | x | 800 | 0,72 |
| 8:50 | 1400 | 900 | 900 | 1 |
| 9:00 | 1400 | 945 | 945 | 1 |
| 9:10 | 1400 | 992 | 992 | 1 |

500

PREVENTING OVERLOAD IN ENTERPRISE APPLICATION INTEGRATION SERVICES

TECHNICAL FIELD

The embodiments of the disclosure relate generally to a computer system and, more specifically, relate to mechanism for preventing overload in enterprise application integration services.

BACKGROUND

Enterprise application integration (EAI) is an integration framework composed of a collection of technologies and services that form a middleware to enable integration of systems and applications across the enterprise. Many services in the EAI are not under control of an integrator or an architect and, as a result, these services can be overloaded, effectively causing slowdown of a message flow and even leading to a failure of the EAI.

One known technique to prevent overload in the EAI is to avoid overload of hardware such as servers. In this technique, certain types of requests are rejected when the load increases. Depending on the overload situation, certain requests are prioritized and certain requests are rejected to decrease the load in the system.

Another known technique to prevent overload in the EAI is to use a bus as an architecture and 'peer-to-peer' as a communication paradigm. This technique enables every service to act as a loosely-coupled, distributed service on the bus, with the associated benefits of granular fail over and scalability. However, none of the above techniques provide for preventing overload of the messages at the service level.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
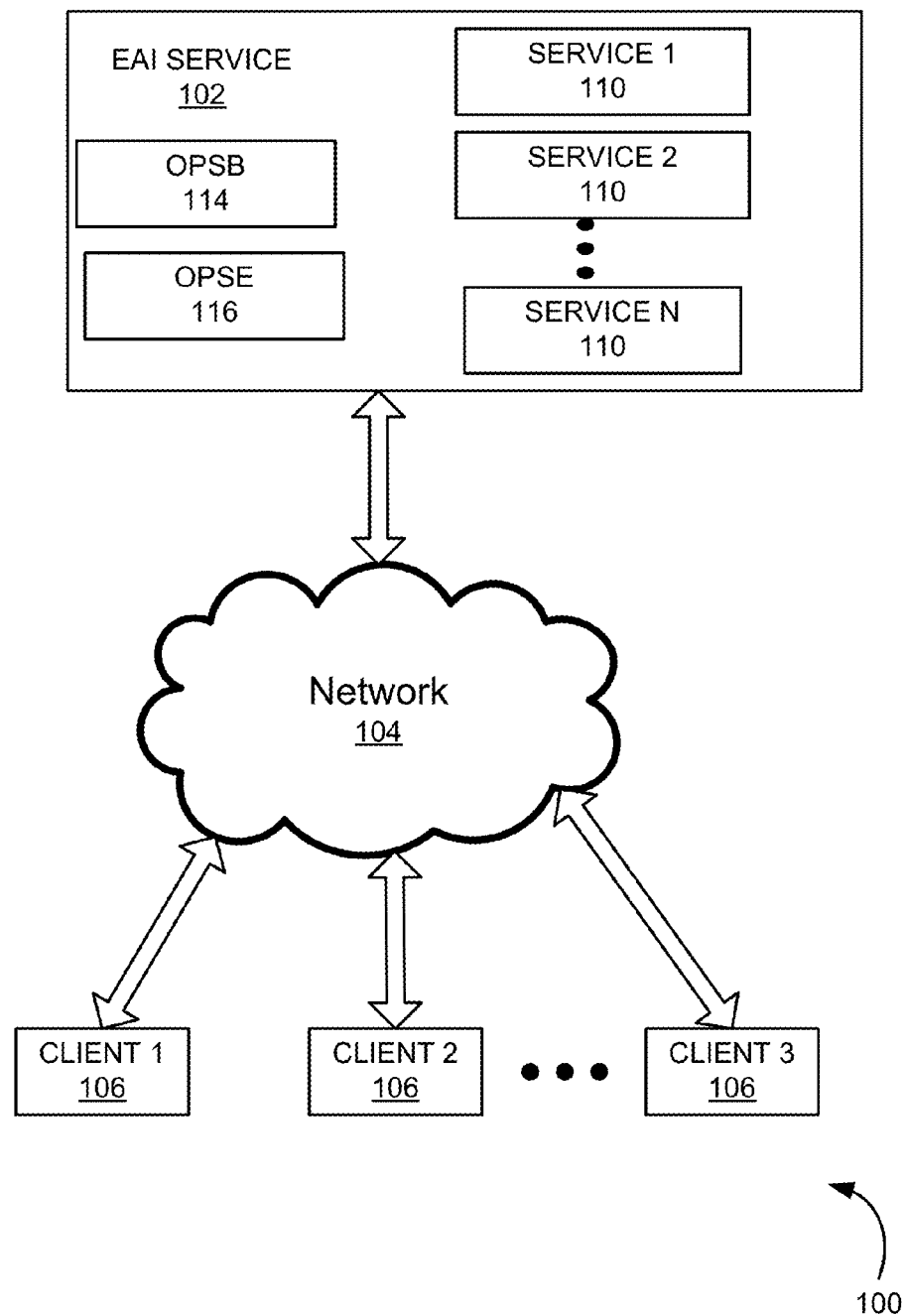
FIG. 1 illustrates an example of a network architecture in which embodiments of the disclosure may operate.

Embodiments of the disclosure provide a mechanism for preventing overload in enterprise application integration (EAI) service. According to one embodiment of the disclosure, a method for preventing overload in enterprise application integration (EAI) service includes determining, by a processing device executing enterprise application integration (EAI) system, a first location in a chain of services in the EAI. The method also includes providing, by the processing device, access for insertion of an overload prevention service beginning (OPSB) at the first location in the chain of services in the EAI. The OPSB includes a service in the chain of services and counts number of messages processed in the EAI service. The method also includes determining, by the processing device, a second location in the chain of services in the EAI. The second location occurs after the first location in the chain of services in the EAI. The method further providing, by the processing device, access for the insertion of an overload prevention service end (OPSE) at the second location in the chain of services in the EAI. The OPSB is in communication with the OPSE and the OPSE comprises a service in the chain of services and is in communication with the OPSB.

In some embodiments, rate of messages received at the first location in the chain of services in the EAI is computed at a time interval. In other embodiments, the rate of messages exiting the EAI is computed from the second location in the chain of services in the EAI at the time interval. In one embodiment, value of a coefficient is computed based on the rate of messages received by the EAI at the time interval, the rate of messages exited from the EAI at the time interval and a number of the time intervals.

In some embodiments, the value of the coefficient is monitored for the number of the time intervals and a value of OPSB limit is computed when the value of the coefficient is above an overload threshold at a first time of the time interval. As such at the first time, an overload of messages in the EAI service is detected. In one embodiment, the OPSB limit is a specific number of messages to be processed by the chain of services.

In some embodiments, the OPSB limit is applied at a second time of the time interval. The second time occurs after the first time. So, regardless of the number of messages received at the EAI 102, the numbers of messages being processed within the EAI service 102 are based on the computed OPSB limit at the second time. Further, the number of messages exiting the EAI service 102 is the same as the OPSB limit. As such, the overload of messages in the EAI service is prevented. In other embodiments, the value of the OPSB limit is increased for a time after the second time of the time interval. The value of the OPSB limit is further increased for the times after the second time until another overload of messages in the EAI service is detected. In one embodiment, the OPSB limit is increased by a constant value.

FIG. 1 illustrates an example of a network architecture 100 in which embodiments of the present disclosure may operate. The network architecture 100 may include external client devices (clients) 106, an Enterprise Application Integration (EAI) service 102 and a network 104. The clients 106 may be computing devices such as, for example, desktop computers, personal computers (PCs), server computers, mobile phones, palm-sized computing devices, personal digital assistants (PDAs), tablet devices, and so on.

The clients 106 are communicably coupled to the EAI service 102 via the network 104. Network 104 may be a public network (e.g., Internet) or a private network (e.g., Ethernet or a local area Network (LAN)). In one embodiment, the client 106 is a server device of an enterprise, but is a "client" with respect to the EAI service 102.

In one embodiment, clients 106 interact with the EAI 102 by exchanging messages via standard protocols including, but not limited to, File Transfer Protocol (FTP) and Hypertext Transfer Protocol (HTTP). Each client 106 runs client applications to generate messages that are processed by the EAI service 102. A message is any type of communication received by the EAI service 102, processed within the EAI service 102 and sent back to the client 106.

In one embodiment, the EAI service 102 includes one or more services 110. In one embodiment, the services 110 represent non-iterative and autonomously-executing programs that communicate with other services through message exchange. The EAI service 102 may also execute the one or more services 110 (e.g., by calling the one or more services 110 sequentially) to process the messages. The services of each service 110 may include system services such as, but not limited to, invocation support, mediation, messaging, process choreography, service orchestration, complex event processing, security (encryption and signing), reliable delivery, transaction management, management (e.g., monitoring, audit, logging, metering), and user defined services.

In some embodiments, the EAI service 102 includes an overload prevention service beginning (OPSB) 114 and an overload prevention service end (OPSE) 116. The OPSB 114 and the OPSE functions to monitor a number of messages in the chain of the one or more services 110 in the EAI. In other embodiments, the or more services 110 in the EAI service 102 are sequentially ordered into a chain such that the messages are processed sequentially by each of the services 110 in a service chain. As such, the chain of services is also known as the pipeline. In one embodiment, the OPSB 114 is included anywhere in the chain of services of the one or more services 110, as long as it is included before the OPSB 116. In another embodiment, the OPSE 116 is included anywhere in the chain of the one or more services 110, as long as it is included after the OPSB 114.

Although, the term "EAI Service" is used in the description, embodiments described herein may also be applied to any service that provides a deployed service to a client that communicates with the service by messages.

Figure 2:
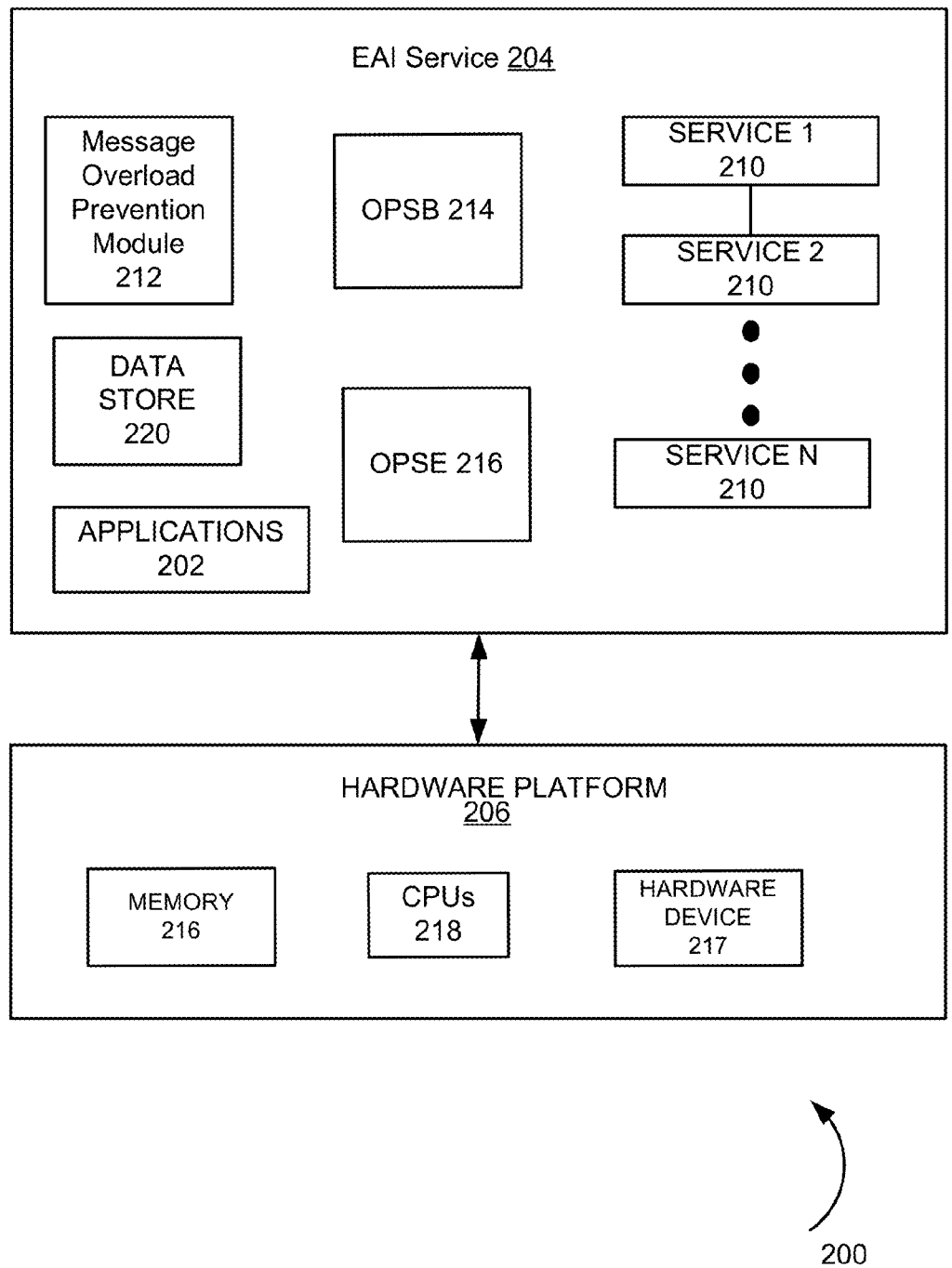
FIG. 2 is a block diagram of one embodiment of an enterprise application integration (EAI) system.

Embodiments of the disclosure provide systems and methods for EAI 102 to prevent overload of messages. FIG. 2 is a block diagram of one embodiment of an EAI service that prevents messages overload according to an embodiment of the disclosure. In one embodiment, EAI system 200 is the same as EAI 102 described with respect to FIG. 1.

In one embodiment, EAI system is a computing machine such as, for example, a server computer, a gateway computer or any other suitable computer system that is configurable for operating as an EAI system 200. As illustrated in FIG. 2, the EAI system 200 may include a hardware platform 206, on top of which runs an EAI service ("EAI") 204 that executes functionality of the EAI service 200.

The hardware platform 206 may include one or more central processing units (CPUs) 218. The hardware platform 206 may also include additional hardware devices 217, such as network interface cards (NICs), sound or video adaptors, photo/video cameras, printer devices, keyboards, displays or any other suitable device intended to be coupled to a computer system. The hardware platform 206 may further include a memory 216. In one embodiment, the memory 216 comprises one or more hardware and software devices, which may be located internally and externally to the ESB system 200. Examples of memory 216 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In some embodiments, the EAI service 204 includes at least one or more services 1-N 210. In one embodiment, the one or more services 210 are same the services 110 of FIG. 1. In one embodiment, the services represent non-iterative and autonomously-executing programs that communicate with other services through message exchange.

In one embodiment, the EAI service 204 also includes a message overload prevention module 212. The message overload prevention module 212 may integrate with applications 202 to prevent overload of the messages in one or more services 210 in the EAI system. In some embodiments, the message overload prevention module 212 integrates with applications 202 to insert a pair of overload prevention services into a chain of the services in the EAI system to prevent overload of the messages in the one or more services. In one embodiment, the application 202 is a web service application.

In some embodiments, the message overload prevention module 212 integrates with the applications 202 to insert an OPSB 214 in the chain of the services in the EAI 204. In one embodiment, the OPSB 214 is the same as the OPSB 114 of FIG. 1. The OPSB 214 functions to monitor number of messages in the chain of services in the EAI system. In other embodiments, the message overload prevention module 212 integrates with the applications 202 to insert an OPSE 216 in the EAI 204. In one embodiment, the OPSE 216 is the same as the OPSE 116 of FIG. 1. The OPSE 216 functions to monitor number of messages in the chain of services in the EAI 204.

In one embodiment, the OPSB 214 may be inserted anywhere in the chain of services of the one or more services 110, as long as it is inserted before the OPSB 216. In another embodiment, the OPSE 216 may be inserted anywhere in the chain of the one or more services 110, as long as it is inserted after the OPSB 114. In some embodiments, the OPSB 214 is implemented as a common service in the chain of services with the exception that it can communicate with the OPSE 216 and can count message throughput, i.e. number of messages processed in the EAI 204. In other embodiments, the OPSB 216 is implemented as a common service in the chain of services with the exception that it can communicate with the OPSB 214.

In some embodiments, the message overload prevention module 212 integrates with the OPSB 214 to determine the rate of messages received by the EAI 204. In other embodiments, the message overload prevention module 212 integrates with the OPSE 216 to determine the rate of messages exiting the EAI 204 for the time interval. In one embodiment, the message overload prevention module 212 integrates with the applications 202 to compute a value of a coefficient based on the rate of messages received by the EAI 204 at the time interval, the rate of messages exited from the EAI 204 at the time interval and a number of the time intervals.

In some embodiments, the message overload prevention module 212 integrates with the applications 202 to monitor the value of the coefficient for the number of the time intervals and a value of OPSB limit is computed when the value of the coefficient is above an overload threshold at a first time of the time interval. As such at the first time, an overload of messages in the EAI 204 is detected. In one embodiment, the OPSB limit is a specific number of messages to be processed by the chain of services.

In some embodiments, the message overload prevention module 212 integrates with the applications 202 to apply the OPSB limit at a second time of the time interval. The second time occurs after the first time. So, regardless of the number of messages entering the EAI 204, the numbers of messages being processed within the EAI 204 are based on the computed OPSB limit at the second time. Further, the number of messages exiting the EAI 204 is the same as the OPSB limit. As such, the overload of messages in the EAI 204 is prevented.

In other embodiments, the message overload prevention module 212 integrates with the applications 202 to increase the value of the OPSB limit for a time after the second time of the time interval. The value of the OPSB limit is further increased for the times after the second time until another overload of messages in the EAI 204 is detected. In one embodiment, the OPSB limit is increased by a constant value.

Figure 3:
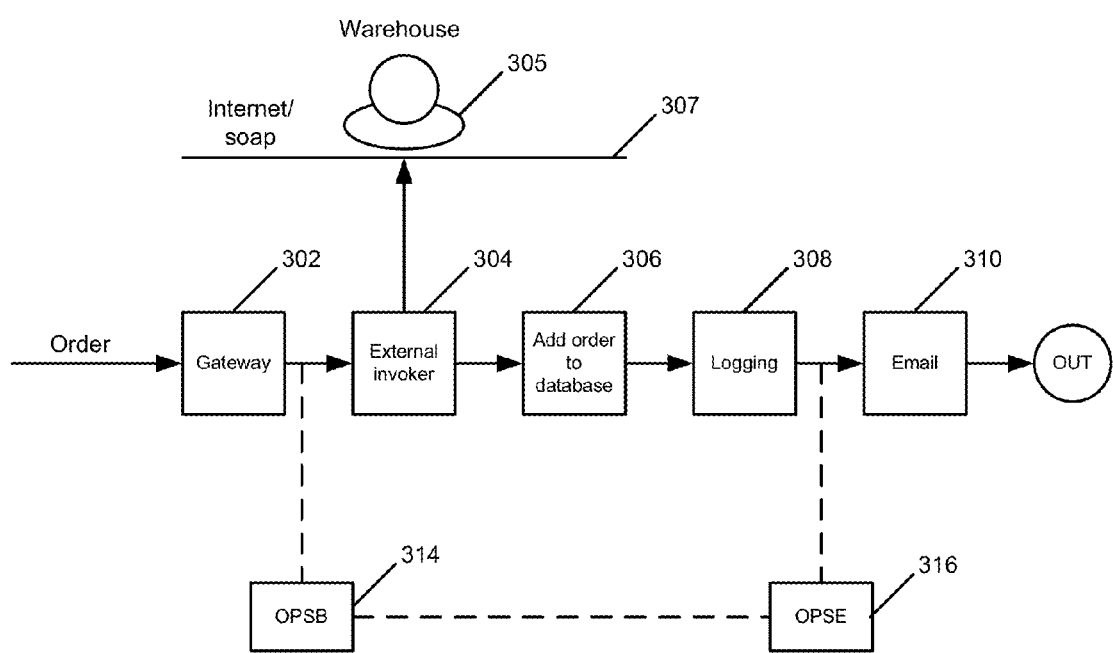
FIG. 3 illustrates an example of services implemented in an EAI system according to an embodiment of the disclosure.

FIG. 3 illustrates an example of one or more services 210 implemented in an EAI system for a warehouse enterprise 305. As shown, the one or more services 210 include, but are not limited to, gateway 302, external invoker 304, add order to database 306, logging 308 and e-mail 310. Also shown is an external service of warehouse 305 invoked by the external invoker 304 service via a network 307. The network 304 may be a public network (e.g., Internet) or a private network (e.g., Ethernet or a local area Network (LAN)).

The example in FIG. 3 illustrates processing orders of some goods for warehouse 305. Initially, gateway 302 service receives the order from a customer. Then, the external invoker 304 service determines if the goods are available at an external service of warehouse 305. The order is added to a database by the add order to database 306 service which is followed by logging the order by the logging 308 service. Lastly, an e-mail is sent to the customer confirming the order by the e-mail 310 service.

The external invoker 304, add order to database 306 and the logging 308 services may be frequently overloaded. In the overload stage, number of messages received at these services may be higher than the number of messages being processed by these services. As such, in one embodiment an administrator or an architect inserts an OPSB 314 after the gateway 302 service and before the external invoker 304 service. In another embodiment, the administrator or the architect The inserts an OPSE 316 after the logging 308 service and immediately before the e-mail 310 service. In one embodiment, the OPSB 314 functions to monitor the number of messages prior to entering into the external invoker 304 service. In another embodiment, the OPSE 316 functions to monitor the number of flow of messages prior to exiting the e-mail 310 service.

In one embodiment, even though the OPSB 314 is inserted before the external invoker 304 service as illustrated in FIG. 3, one skilled in the art would recognize that the OPSB 314 may be inserted in another location in the chain of services as long as the OPSB 314 is inserted before the OPSE 316. In another embodiment, even though the OPSB 316 is inserted after the logging 308 service as illustrated in FIG. 3, one skilled in the art would recognize that the OPSE 316 may be inserted in another location in the chain of services as long as the OPSE 316 is inserted after the OPSB 314.

Figure 4A:
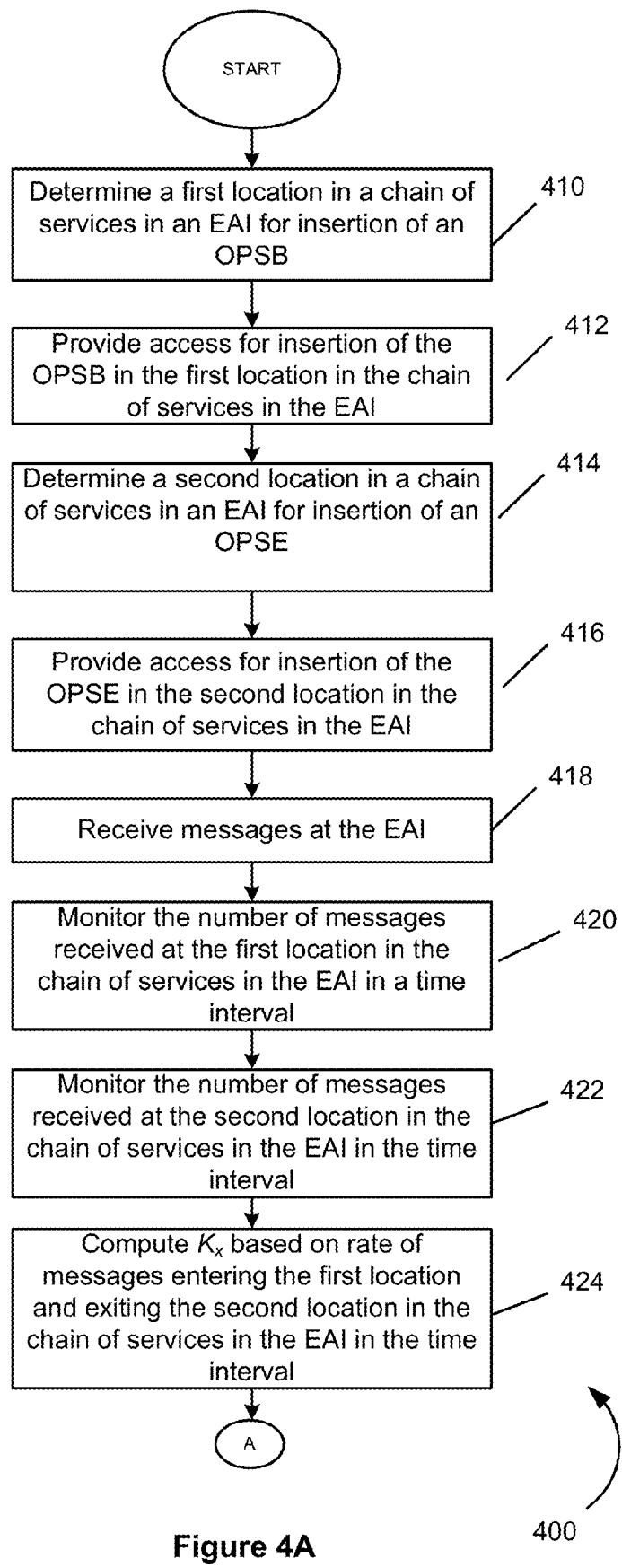
FIG. 4A is a flow diagram of one embodiment of a method for preventing overload in an EAI system.
Figure 4B:
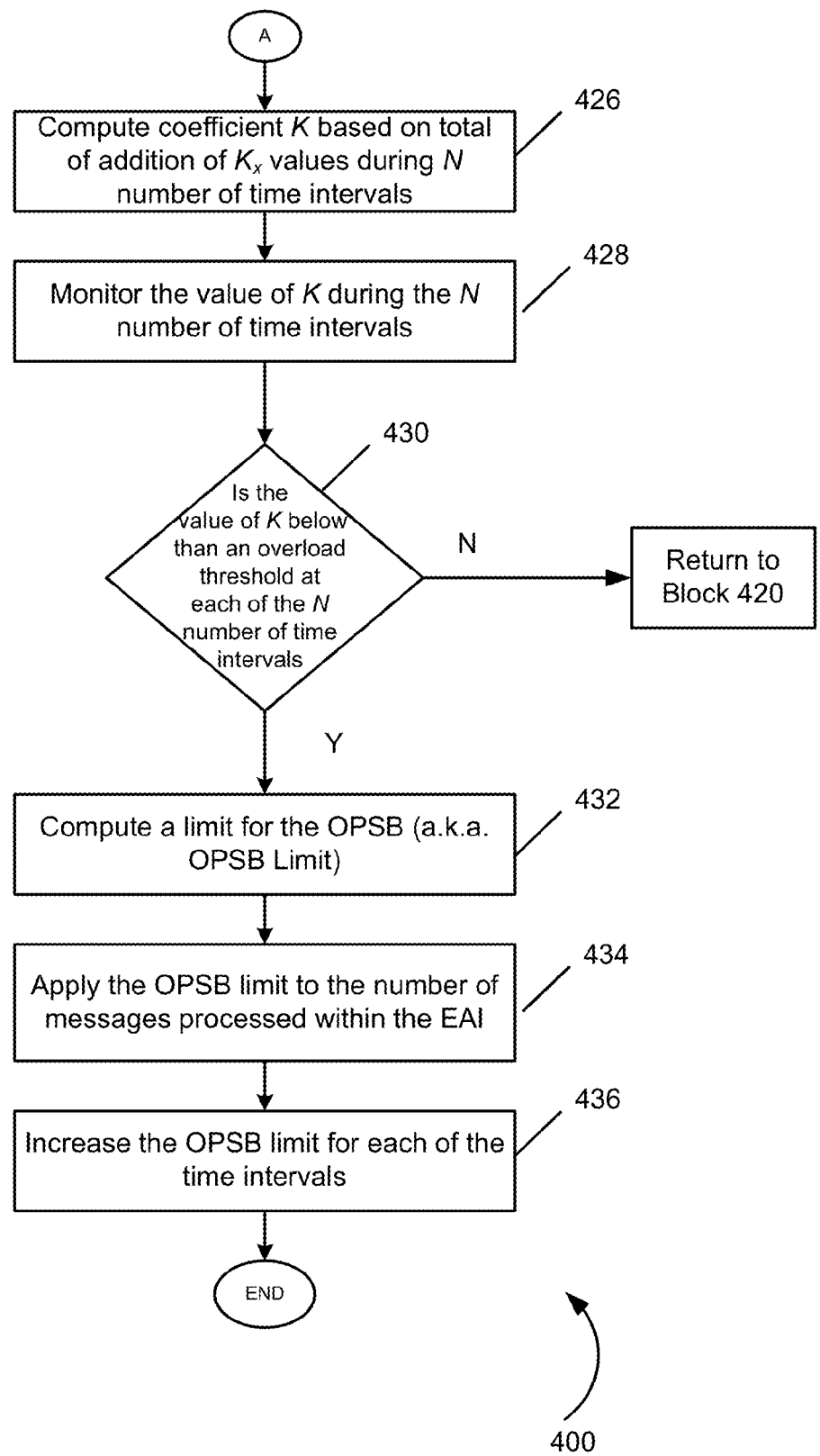
FIG. 4B is a flow diagram of the one embodiment of a method for preventing overload in an EAI system.

FIGS. 4A and 4B are a flow diagram illustrating a method 400 for preventing overload in the EAI system according to an embodiment of the present disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the message overload prevention module 212 of the EAI system 200 of FIG. 2.

Method begins at block 410 where the message overload prevention module 212 of the EAI 204 determines a first location in the chain of services 210 in the EAI for insertion of the OPSB 214. At block 412, the message overload prevention module 212 provides access for insertion of the OPSB 214 in the first location of the chain of services in the EAI 204. In one embodiment, an administrator or an architect inserts the OPSB 214 in the first location in the chain of services in the EAI 204. At block 414, the message overload prevention module 212 determines a second location in the chain of services 210 in the EAI for insertion of the OPSE 216. At block 416, the message overload prevention module 212 provides the access to allow insertion of the OPSE 216 in the second location in the chain of services in the EAI 204. In one embodiment, the second location occurs after the first location in the chain of services 210. In another embodiment, an administrator or an architect inserts the OPSE 216 in the chain of services in the EAI 204.

At block 418, messages are received at the EAI 204. At block 420, the OPSB 214 monitors the number of messages being received at the first location of the chain of services 210 in the EAI service 204 in a time interval. In one embodiment, the time interval is the time is set by an administrator. In another embodiment, the message overload prevention module 212 counts the number of messages monitored by the OPSB 214. The monitoring of the messages may occur during run-time. In one embodiment, the run-time of the EAI service is when the EAI service accepts and process client request. At block 422, the OPSE 214 monitors the number of messages being received at the second location of the chain of services in the EAI service 204 in the time interval. The time interval for the rate of messages received at the first location is the same as the time interval for the rate of messages received at the second location. In one embodiment, the time interval is the time is set by an administrator. In another embodiment, the message overload prevention module 212 counts the number of messages monitored by the OPSB 216. At block 424, the message overload prevention module computes the rate of messages $K_x$ received at the first location of the OPSB 214 and exited from the second location of the OPSE 216 in the EAI 204 in the time interval using the following formula:

$$K_x = \text{rate}(\text{OPSE}, TWINDOW_x)/\text{rate}(\text{OPSB}, TWINDOW_x)$$

where rate (OPSE, $TWINDOW_x$) is the rate of messages monitored at the OPSE 216 during the time interval, $TWINDOW_x$ and rate(OPSB, $TWINDOW_x$) is the rate of messages monitored at the OPSB 214 during the time interval, $TWINDOW_x$.

In one embodiment, $K_x$ is a value between 0 and 1. In some embodiments, if the value of $K_x$ is 1, the performance of the EAI service is optimized such that the rate of messages exiting the EAI is same as the rate of messages entering the EAI. When the performance of the EAI service is optimized, all the messages in the chain/pipeline of the services are being processed. In other embodiments, if the value of $K_x$ is less than 1, then the performance of the EAI is less than optimal, such that all the messages in the chain/pipeline of the services are not being processed. Blocks 418 to 424 are repeated for several time intervals.

Figure 5:
FIG. 5 illustrates an example of a table representing prevention of overload in an EAI system.

FIG. 5 illustrates an example of a table 500 of a number of messages entering and exiting the EAI service at several time intervals. Specifically the table 500 shows time interval, t, 502, rate of input messages, 504, OPSB limit 506 for input messages, rate of output messages 508 and the value of $K_x$ 510 for each of the time interval t, 502. In one embodiment, the table 500 is generated based on the blocks 418 to 424 repeated for the several time intervals. The table 500 is generated by the message overload prevention module 212 and stored in the data store 220.

Referring back to FIG. 4B, at block 426, the message overload prevention module 212 computes a coefficient, K by the following formula:

$$K = \frac{\sum_{i \in \{1 \ldots n-1\}} Ki}{N}$$

where N is the number of time intervals, and $\Sigma i \in \{1 \ldots n-1\}$ Ki is the total of addition of the $K_x$ values during the N number of time intervals. At block 428, the value of the coefficient, K is monitored during the N number of time intervals. At block 430, the message overload prevention module determines whether the value of the K is below the overload threshold at each of the N number of time intervals. If at block 430, it is determined that the value of K is not below the overload threshold at each of the time intervals, then the blocks 420 to 428 are repeated. As such, an overload of the messages has not been detected.

Referring again to the table of FIG. 5, as an example, in the time intervals, t, 8:00, 8:10 and 8:20, the value of K is computed as 1 by using the above formula as follows:

$$K = \frac{\sum_{i \in \{1 \ldots n-1\}} Ki}{N} = \frac{1+1+1}{3} = 1$$

The value of overall threshold in this example is 0.90. Because the value 1 is greater than the overload threshold value, 0.90, the overload hasn't been detected.

Furthermore, as shown in table 500 of FIG. 5, for the time intervals 8:10, 8:20, 8:30, the value of K is computed as 0.98 by using the above formula as follows:

$$K = \frac{\sum_{i \in \{1 \ldots n-1\}} Ki}{N} = \frac{1+1+0.95}{3} = 0.98$$

Because the value 0.98 is also greater than the overload threshold value, 0.90, the overload has not been detected.

For the time intervals 8:20, 8:30, 8:40, the value of K is computed as 0.89 by using the above formula as follows:

$$K = \frac{\sum_{i \in \{1 \ldots n-1\}} Ki}{N} = \frac{1+0.95+0.72}{3} = 0.89$$

The value 0.89 is below the overload threshold value 0.90. As such, the overload has been detected for these time intervals.

Referring back to FIG. 4B, if at block, 430, it is determined that the value of K is below the overload threshold at one of the N number of the time intervals, an overload of messages has been detected. Method 400 then proceeds to block 432, where the message overload prevention module 212 computes a limit for the OPSB ("OPSB limit"). In one embodiment, the OPSB limit is a specific number of messages allowed to be processed by the chain of the services of the EAI. For example, the OPSB limit may be computed as follows:

$$R_1 - \frac{\sum_{i \in \{1 \ldots n-1\}} R_i - R_{i+1}}{N-1}$$

where N is the number of time intervals, $R_1$ is the number of messages exiting the EAI in a first interval and $\Sigma i \in \{1 \ldots n-1\}^{Ri-Ri+1}$ is the difference between the number of messages exiting the EAI in a first time, t1, of the time interval and a second time, t2, of the time interval such that the t2 occurs immediately after the t1.

At block 434, the OPSB limit is applied to the number of messages processed within the EAI. In one embodiment, the OPSB limit is applied at a third time, t3, such that t3 occurs immediately after t2. As such, regardless of the number of messages entering the EAI service 102, the numbers of messages processed within the EAI service 102 are based on the computed OPSB limit at the t3.

Referring back to table 500 of FIG. 5, the OPSB limit is computed as follows:

$$R_1 - \frac{\sum_{i \in \{1 \ldots n-1\}} R_i - R_{i+1}}{N-1} = 1000 - \frac{200}{2} = 900$$

The OPSB limit of 900 is applied at the time window 8:50 such that the number of input messages being processed in the EAI service is limited to 900 even though the total number of input messages being received at the EAI service are 1400. OPSB limits count of input messages to 900. In the example of table 500, in the time window 8:50, the number of output messages is greater than in the previous time window, 8:40.

Referring back to FIG. 4, at block 436, the OPSB limit is increased for each of the time intervals occurring after the t3 time interval until another overload is detected. In one embodiment, the OPSB limit is increased by a constant value.

Referring back to the table of FIG. 5, the OPSB limit at the time 9:00 is increased by 5% such that the OPSB limit is 945, followed by another increase of 5% such that the OPSB limit is 992 at the time 9:10.

Figure 6:
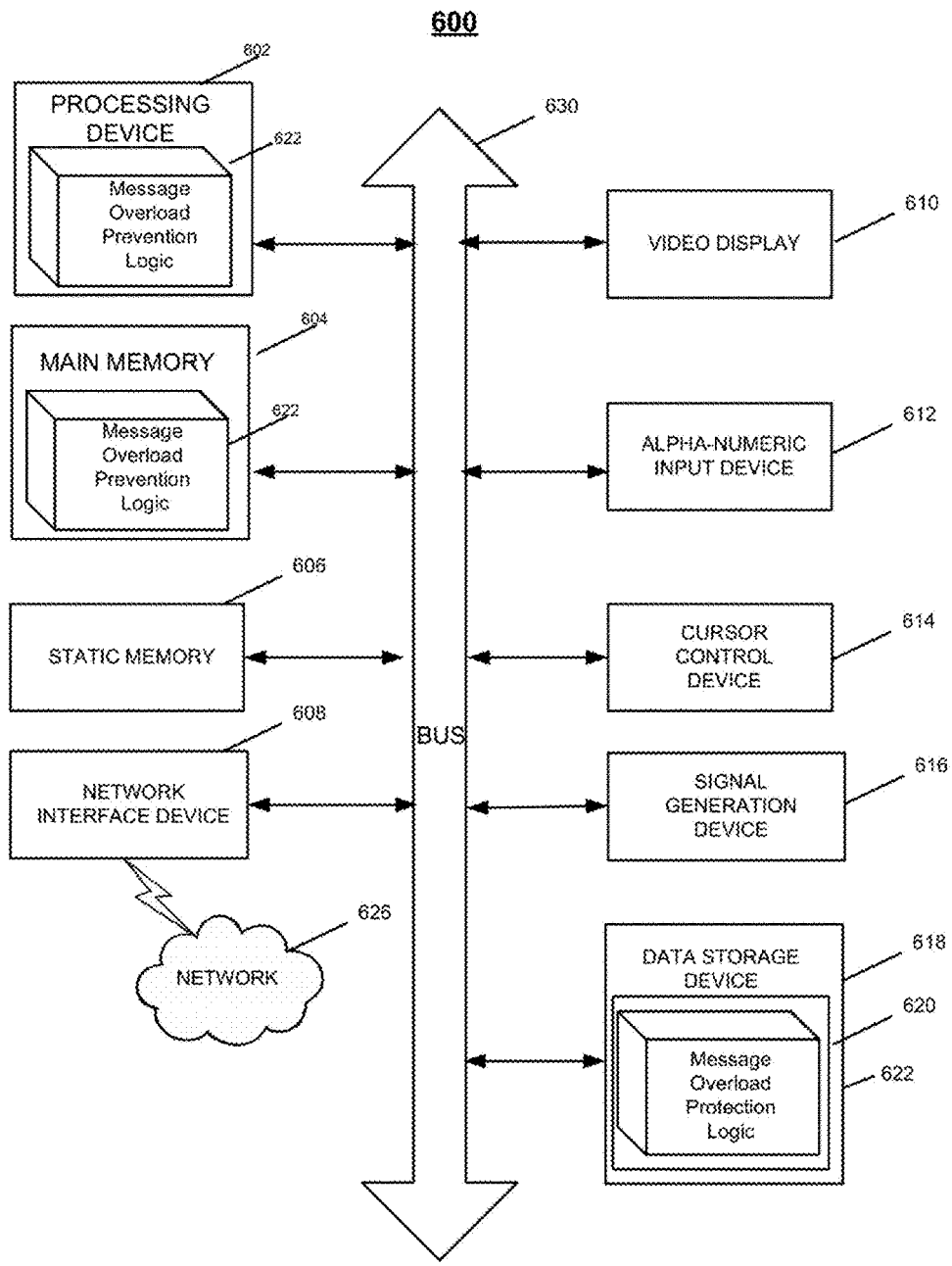
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute message overload prevention logic 622 for performing the operations and steps discussed herein. In one embodiment, message overload prevention module 212 described with respect to FIG. 2 performs the message overload prevention logic 622.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium (or more specifically a computer-readable storage medium) 620 on which is stored one or more sets of instructions (e.g. message overload prevention logic 622) embodying any one or more of the methodologies of functions described herein, such as method 400 for preventing overloading of the messages described with respect to FIG. 4. The message overload prevention logic 622 may also reside, completely or at least partially, within the memory 606 and/or within the processing device 602 during execution thereof by the computer system 600; the memory 606 and the processing device 602 also constituting machine-accessible storage media.

The machine-readable storage medium 620 may also be used to store the message overload prevention processing logic 622 persistently containing methods that call the above applications. While the machine-readable storage medium 620 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", 'computing", "sending", "determining", "storing", "inserting", 'increasing" "applying", "monitoring" "providing" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method, comprising:
   determining, by a processing device executing an enterprise application integration (EAI) system, a first location in a chain of services in the EAI, wherein the first location is associated with a first service in the chain of services;
   providing, by the processing device, access to insert an overload prevention service beginning (OPSB) at the first location in the chain of services in the EAI, wherein the OPSB comprises the first service in the chain of services and a count of a number of messages processed by the EAI service in the chain of services;
   determining, by the processing device, a value of a coefficient in view of a rate of receipt of the messages at the first location associated with the first service in the chain of services, a rate of exit of the messages from the chain of services in the EAI service; and a number of time intervals;
   computing, by the processing device, a value of an OPSB limit of the OPSB in response to the value of the coefficient satisfying an overload threshold at a first time of a time interval among the number of time intervals;
   applying, by the processing device, the OPSB limit at a second time of the time interval, wherein the second time occurs after the first time, and the OPSB limit is a number of the messages to be processed by the EAI service in the chain of services;
   determining, by the processing device, a second location of a second service in a chain of services associated with the EAI service; and
   providing, by the processing device, access to insert an overload prevention service end (OPSE) at the second location, wherein the OPSE monitors a number of messages received at the second location and the OPSB is in communication with the OPSE.

2. The method of claim 1, further comprising:
   receiving messages at the EAI;
   computing the rate of receipt of the messages at the first location in the chain of services in the EAI at a time interval; and
   computing the rate of exit of the messages from the second location in the chain of services in the EAI at the time interval.

3. The method of claim 1, further comprising increasing the OPSB limit for another time after the second time of the time interval.

4. The method of claim 3, wherein the OPSB limit is increased by a constant value.

5. A system comprising:
   a memory; and
   a processing device, operatively coupled to the memory to:
   determine a first location in a chain of services in an enterprise application integration (EAI), wherein the first location is associated with a first service in the chain of services;
   provide access to insert an overload prevention service beginning (OPSB) at the first location in the chain of services in the EAI, wherein the OPSB comprises the first service in the chain of services and a count of a number of messages processed by the EAI service in the chain of services;
   determine a value of a coefficient in view of a rate of receipt of the messages at the first location associated with the first service in the chain of services, a rate of exit of the messages from the chain of services in the EAI service; and a number of time intervals;
   compute a value of an OPSB limit of the OPSB in response to the value of the coefficient satisfying an overload threshold at a first time of a time interval among the number of time intervals;
   apply the OPSB limit at a second time of the time interval, wherein the second time occurs after the first time, and the OPSB limit is a number of the messages to be processed by the EAI service in the chain of services; and
   determine a second location of a second service in a chain of services associated with the EAI service; and
   provide access to insert an overload prevention service end (OPSE) at the second location, wherein the OPSE monitors a number of messages received at the second location and the OPSB is in communication with the OPSE.

6. The system of claim 5, wherein the processing device is further to:
   receive messages at the EAI;
   compute the rate of receipt of the messages at the first location in the chain of services in the EAI at a time interval; and
   compute the rate of exit of the messages from the second location in the chain of services in the EAI at the time interval.

7. The system of claim 5, wherein the processing device is further to increase the OPSB limit for another time after the second time of the time interval.

8. The system of claim 7, wherein the OPSB limit is increased by a constant value.

9. A non-transitory machine-readable storage medium comprising data that, when accessed by a processing device, cause the processing device to:
   determine, by the processing device executing an enterprise application integration (EAI) system, a first location in a chain of services in the EAI, wherein the first location is associated with a first service in the chain of services;
   provide, by the processing device, access to insert an overload prevention service beginning (OPSB) at the first location in the chain of services in the EAI, wherein the OPSB comprises the first service in the chain of services and a count of a number of messages processed by the EAI service in the chain of services;

determine a value of a coefficient in view of a rate of receipt of the messages at the first location associated with the first service in the chain of services, a rate of exit of the messages from the chain of services in the EAI service; and a number of time intervals;

compute a value of an OPSB limit of the OPSB in response to the value of the coefficient satisfying an overload threshold at a first time of a time interval among the number of time intervals;

apply the OPSB limit at a second time of the time interval, wherein the second time occurs after the first time, and the OPSB limit is a number of the messages to be processed by the EAI service in the chain of services;

determine a second location of a second service in a chain of services associated with the EAI service; and provide access to insert an overload prevention service end (OPSE) at the second location, wherein the OPSE monitors a number of messages received at the second location and the OPSB is in communication with the OPSE.

10. The non-transitory machine-readable storage medium of claim 9, wherein the processing device is further to:

receive messages at the EAI;

compute the rate of receipt of the messages at the first location in the chain of services in the EAI at a time interval; and compute the rate of exit of the messages from the second location in the chain of services in the EAI at the time interval.

11. The non-transitory machine-readable storage medium of claim 9, wherein the processing device is further to increase the OPSB limit for a time after the second time of the time interval, wherein the OPSB limit is increased by a constant value.

12. The method of claim 1, wherein the number of messages exiting the chain of services in the EAI service is substantially same as the OPSB limit.

13. The system of claim 5, wherein the number of messages exiting the chain of services in the EAI service is substantially same as the OPSB limit.

14. The non-transitory machine-readable storage medium of claim 9, wherein the number of messages exiting the chain of services in the EAI service is substantially same as the OPSB limit.

* * * * *